US010936050B2

(12) United States Patent
Yamamoto et al.

(10) Patent No.: US 10,936,050 B2
(45) Date of Patent: Mar. 2, 2021

(54) SYSTEMS AND METHODS FOR USER INDICATION RECOGNITION

(71) Applicants: Honda Motor Co., Ltd., Tokyo (JP); Edge 3 Technologies, LLC, Phoenix, AZ (US)

(72) Inventors: Stuart Yamamoto, Raymond, OH (US); Pedram Vaghefinazari, Raymond, OH (US); Tarek A. El Dokor, Phoenix, AZ (US); Jordan Cluster, Tempe, AZ (US)

(73) Assignees: HONDA MOTOR CO., LTD., Tokyo (JP); EDGE3 TECHNOLOGIES, LLC, Phoenix, AZ (US)

( * ) Notice: Subject to any disclaimer, the term of this patent is extended or adjusted under 35 U.S.C. 154(b) by 198 days.

(21) Appl. No.: 14/306,148

(22) Filed: Jun. 16, 2014

(65) Prior Publication Data

US 2015/0362988 A1 Dec. 17, 2015

(51) Int. Cl.

| | |
|---|---|
| ***G06F 3/01*** | (2006.01) |
| ***G06F 3/0487*** | (2013.01) |
| *G10L 15/00* | (2013.01) |
| *G10L 15/24* | (2013.01) |
| *G10L 15/22* | (2006.01) |

(52) U.S. Cl.

CPC .............. *G06F 3/011* (2013.01); *G06F 3/017* (2013.01); *G06F 3/0487* (2013.01); *G10L 15/00* (2013.01); *G10L 15/24* (2013.01); *G10L 2015/223* (2013.01)

(58) Field of Classification Search

CPC ........ G06F 3/011; G06F 3/0487; G06F 3/017; G10L 15/00; G10L 2015/223; G10L 15/24; G01C 21/3682; G01C 21/3679

See application file for complete search history.

(56) References Cited

U.S. PATENT DOCUMENTS

| | | | | |
|---|---|---|---|---|
| 5,948,040 | A | 9/1999 | DeLorme et al. | |
| 6,049,755 | A * | 4/2000 | Lou .................... | G01C 21/3667 340/988 |
| 6,128,003 | A | 10/2000 | Smith et al. | |
| 7,050,606 | B2 | 5/2006 | Paul et al. | |
| 7,289,645 | B2 | 10/2007 | Yamamoto et al. | |
| 7,561,961 | B2 | 7/2009 | Wakamatsu et al. | |

(Continued)

OTHER PUBLICATIONS

Graham-Rowe, D., "Give Your Dashboard the Finger," Feb. 2, 2011, MIT Technology Review, 2 pages. [Online] [Retrieved May 5, 2014] Retrieved from the Internet <URL: http://www.technologyreview.com/news/422584/give-your-dashbaord-the-finger/>.

(Continued)

*Primary Examiner* — Patrick N Edouard
*Assistant Examiner* — Joseph P Fox
(74) *Attorney, Agent, or Firm* — Rankin, Hill & Clark LLP

(57) ABSTRACT

Various methods and apparatuses are provided to determine an occurrence of a first user indication and determine a plurality of Points of Interest (POI) corresponding to the first user indication, and to determine an occurrence of a second user indication and responsively determine a narrowed POI from the plurality of POIs. An action corresponding to the narrowed POI and the first and/or second user indication is determined and effected.

16 Claims, 6 Drawing Sheets

300

302 SENSE A USER INDICATION

304 DETERMINE AN OCCURRENCE OF A FIRST USER INDICATION

306 DETERMINE A PLURALITY OF POIs

308 IF WITHIN THE OUTER ENVIRONMENT, USE, IN PART, LOCATION DATA, COMPASS DATA, STEERING WHEEL ANGLE DATA, SPEED DATA, OR CAN BUS DATA TO DETERMINE THE PLURALITY OF POIs

310 DETERMINE AN OCCURRENCE OF A SECOND USER INDICATION

312 DETERMINE A NARROWED POI

314 DETERMINE AN ACTION CORRESPONDING TO THE NARROWED POI AND THE FIRST AND/OR SECOND USER INDICATION

316 EFFECT PERFORMANCE OR THE ACTION

(56) References Cited

U.S. PATENT DOCUMENTS

| | | | | |
|---|---|---|---|---|
| 8,265,864 | B1 * | 9/2012 | Kaufman | G01C 21/3679 340/995.14 |
| 8,378,970 | B2 | 2/2013 | Nishida et al. | |
| 8,818,716 | B1 | 8/2014 | El Dokor et al. | |
| 8,886,399 | B2 | 11/2014 | El Dokor et al. | |
| 2004/0254723 | A1 * | 12/2004 | Tu | G01C 21/3679 701/410 |
| 2005/0107949 | A1 * | 5/2005 | Yokota | G01C 21/3611 701/532 |
| 2005/0264527 | A1 | 12/2005 | Lin | |
| 2007/0150444 | A1 | 6/2007 | Chesnais et al. | |
| 2007/0177806 | A1 | 8/2007 | Vartiainen | |
| 2007/0225904 | A1 * | 9/2007 | Pantalone | G01C 21/367 701/455 |
| 2008/0133133 | A1 | 6/2008 | Abels | |
| 2008/0273715 | A1 | 11/2008 | Snider et al. | |
| 2009/0012953 | A1 * | 1/2009 | Chu | H04W 4/02 |
| 2009/0103780 | A1 | 4/2009 | Nishihara et al. | |
| 2009/0278915 | A1 | 11/2009 | Kramer et al. | |
| 2009/0287361 | A1 | 11/2009 | Iwashima et al. | |
| 2009/0315776 | A1 * | 12/2009 | Khosravy | G01S 19/49 342/452 |
| 2009/0319175 | A1 * | 12/2009 | Khosravy | G01C 21/3679 701/467 |
| 2009/0319348 | A1 * | 12/2009 | Khosravy | G01C 21/20 705/14.1 |
| 2010/0050133 | A1 | 2/2010 | Nishihara et al. | |
| 2010/0171767 | A1 * | 7/2010 | Waeller | B60K 35/00 345/672 |
| 2010/0185341 | A1 | 7/2010 | Wilson et al. | |
| 2010/0231509 | A1 | 9/2010 | Boillot et al. | |
| 2010/0253542 | A1 | 10/2010 | Seder et al. | |
| 2010/0274480 | A1 * | 10/2010 | McCall | G01C 21/3664 701/408 |
| 2010/0305849 | A1 * | 12/2010 | Nirhamo | G01C 21/3635 701/467 |
| 2011/0004523 | A1 * | 1/2011 | Giuli | G01C 21/36 705/14.58 |
| 2011/0050589 | A1 | 3/2011 | Yan et al. | |
| 2011/0221666 | A1 | 9/2011 | Newton et al. | |
| 2011/0246478 | A1 * | 10/2011 | Deng | G01C 21/3679 707/743 |
| 2011/0286676 | A1 | 11/2011 | El Dokor | |
| 2012/0062558 | A1 | 3/2012 | Lee et al. | |
| 2012/0068956 | A1 | 3/2012 | Jira et al. | |
| 2012/0197524 | A1 * | 8/2012 | Beyeler | G01C 21/3682 701/426 |
| 2012/0260195 | A1 * | 10/2012 | Hon | G06F 16/954 715/753 |
| 2012/0264457 | A1 | 10/2012 | Khosravy et al. | |
| 2012/0327232 | A1 | 12/2012 | Yang et al. | |
| 2013/0030811 | A1 | 1/2013 | Olleon et al. | |
| 2013/0066526 | A1 | 3/2013 | Mondragon et al. | |
| 2013/0204457 | A1 | 8/2013 | King et al. | |
| 2013/0249812 | A1 * | 9/2013 | Ramos | G06F 3/0481 345/173 |
| 2013/0261871 | A1 | 10/2013 | Hobbs et al. | |
| 2014/0032098 | A1 * | 1/2014 | Anderson | G01C 21/3658 701/428 |
| 2014/0365118 | A1 * | 12/2014 | Moore | G01C 21/3632 701/491 |
| 2015/0187100 | A1 * | 7/2015 | Berry | G06T 11/20 345/634 |

OTHER PUBLICATIONS

Non-Final Office Action dated Jan. 17, 2014 for U.S. Appl. No. 13/834,007, 9 pages.

Notice of Allowance dated Jul. 10, 2014 for U.S. Appl. No. 13/834,007, 5 pages.

Non-Final Office Action dated Nov. 29, 2013 for U.S. Appl. No. 13/835,252, 9 pages.

Notice of Allowance dated Mar. 17, 2013 for U.S. Appl. No. 13/835,252, 8 pages.

PCT International Search Report, PCT Application No. PCT/US2014/024852, dated Sep. 24, 2014, 4 pages.

Guo, D., et al., "Vision-Based Hand Gesture Recognition for Human-Vehicle Interaction," Proceedings of the International Conference on Control, Automation and Computer Vision, 1998, pp. 151-155, vol. 1.

Howley, D., "Mercedes Benz's Dice Augmented Reality System: Minority Report for Your Car," Laptopmag.com, Jan. 12, 2013, 6 pages [online] [retrieved on Jun. 13, 2014]; http://blog.laptopmag.com/mercedes-benzs-dice-augemented-reality-system-minority-report-for-your-car.

Mashita, T., et al., "A Wearable Camera System for Pointing Gesture Recognition and Detecting Indicated Objects," Proceedings of the 2003 Conference on Computer Vision and Pattern Recognition Workshop (CVPRW '03), 2003 6 pages.

Yoon, H.-S., et al. "Hand gesture recognition using combined features of location, angle and velocity," Pattern Recognition, 2001, pp. 1491-1507, vol. 34.

* cited by examiner

SYSTEMS AND METHODS FOR USER INDICATION RECOGNITION

FIELD OF THE INVENTION

The present disclosure generally relates to methods and systems for determining points of interest in response to user indications.

BACKGROUND

Human Machine Interface (HMI) systems are presently understood as systems that allow users to interface with a machine (such as computing devices, mobile devices, televisions, automobiles, home automation systems, and so forth) through various human interface methods, including audible indications and physical gesture indications from a user. An HMI system may include a user indication recognition system that may employ any number of devices and methods to sense and determine an indication output by a user. For example, such a system may utilize microphones, cameras, motion detectors, and other devices to capture verbal indications spoken by a user and/or indication gestures performed by a user. These systems may then process such captured data to determine one or more user-intended commands or inquiries and one or more appropriate responses or actions.

Such systems are presently employed within limited environments so as to provide a workable and limited set of commands and data that an HMI system may respond to or search through. For example, it is understood that HMI systems may be used in conjunction with an automobile to allow a user of an automobile to interface with various systems within the automobile (for example, the radio, the climate control system, and so forth). As another example, present HMI systems may be used in conjunction with televisions to allow a user to interface with the television.

Though suitable for at least some purposes, such approaches do not necessarily meet all needs of all application settings and/or all users. For example, present HMI systems do not allow a user to interface with a single HMI system to provide commands or inquiries regarding points of interest that may be within different or multiple environments.

SUMMARY

In one embodiment, an apparatus is provided including at least one sensor device configured to sense at least one user indication, the user indication being an indication gesture and/or an audible indication. The apparatus may further include at least one processing device communicatively coupled to the at least one sensor device. The processing device can be configured to determine an occurrence of a first user indication; determine a plurality of Point of Interest (POI) corresponding to the first user indication; determine an occurrence of a second user indication; determine a narrowed POI from the plurality of POIs; determine an action corresponding the narrowed POI and the first and/or second user indications; and effect performance of the action.

In another embodiment, a method is provided including sensing an occurrence of a first user indication and determining a plurality of POIs corresponding to the first user indication. The method further includes sensing an occurrence of a second user indication and determining a narrowed POI from the plurality of POIs in response to sensing the occurrence of the second user indication. The method also includes determining an action corresponding to the narrowed POI and the first and/or second user indications; and performing the action.

In another embodiment, a method is provided including sensing an occurrence of a first user indication and determining a plurality of POIs corresponding to the first user indication. The method further includes sensing an occurrence of a second user indication and determining a narrowed POI from the plurality of POIs in response to sensing the occurrence of the second user indication. The method also includes performing an action corresponding to the narrowed POI.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Additionally, as this disclosure is directed to a user indication recognition system 100 and method, it should be recognized that "indication" can designate any type of potential input, including, but not limited to indication gestures including hand movements, head movements, eye movements, body movements, or various other bio-metric observations of a user or other actions or activities undertaken by a user, whether intentional or unintentional. Further, "indication" can include audible indications, including but not limited to spoken words and phrases, spoken utterances, humming, sung or hummed tunes, whistling, respiratory sounds, guttural sounds, clicking, clapping, snapping, and other verbal and non-verbal sounds.

Figure 1:
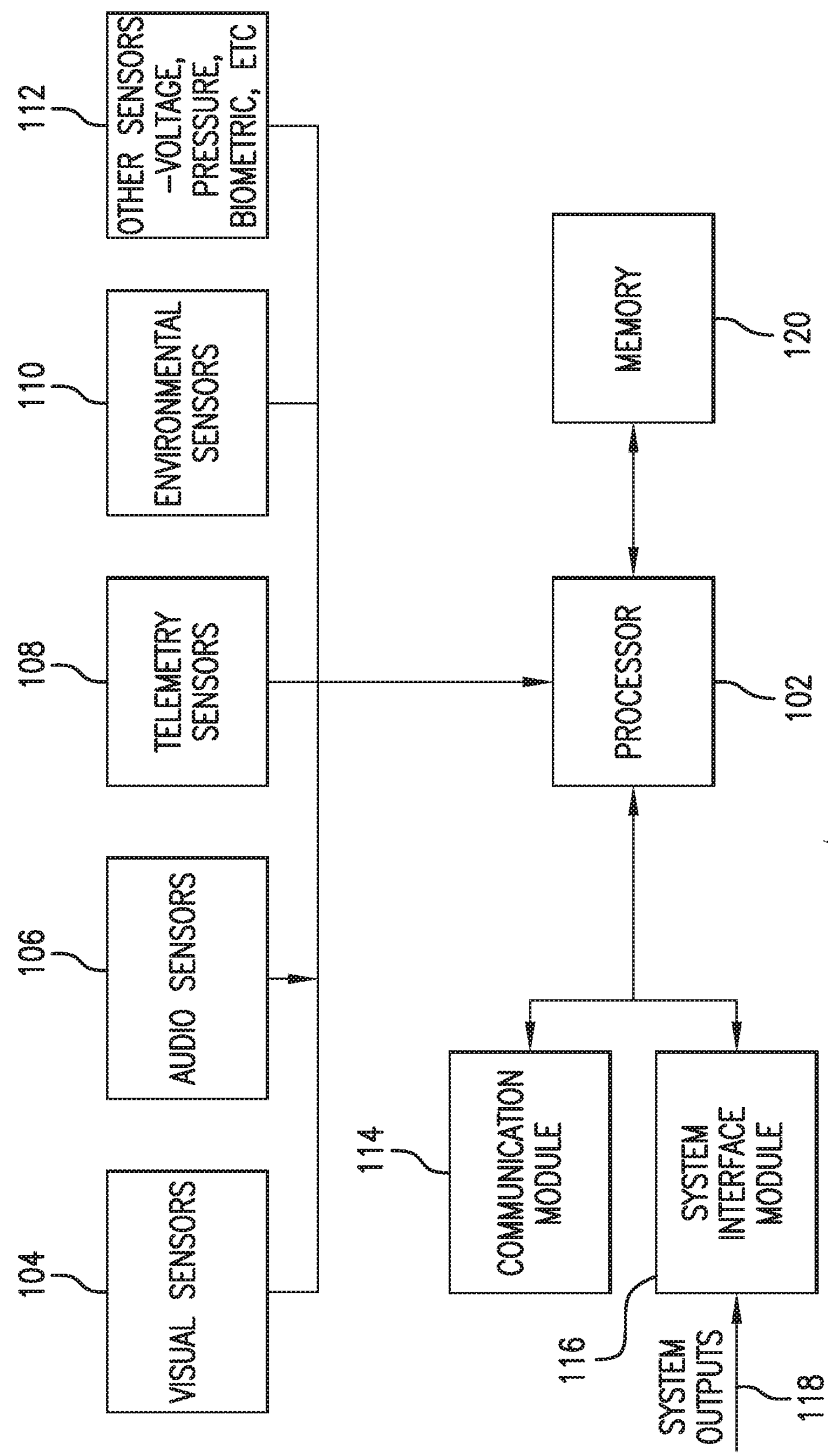
FIG. 1 is a block diagram illustrating functional components of a user indication recognition system in accordance with various embodiments.

Referring now to the figures, FIG. 1 illustrates an example configuration of a user indication recognition system 100 according to one approach. The system 100 includes at least one processing device 102. Although depicted and often described herein as a singular processing device 102 (e.g., "the processing device 102"), the at least one processing device 102 may comprise multiple distinct processing devices 102 that may be co-located within a singular physical system, may be co-located within a singular larger architecture (such as within a larger system beyond the user indication recognition system 100), or may be relatively co-located though part of distinct systems (for example, a vehicle coupled to a mobile device that is within or near the vehicle). Alternatively still, the at least one processing device 102 may be multiple processing devices that are physically remote from each other. For example, various processing devices may collaborate in a cloud-computing setting or in a client/server application setting wherein various portions of the required processing operations are performed by distinct and remote processing devices that are coupled through known telecommunication systems and methods. Further, the at least one processing device 102 may include any known processing devices including but not limited to any of the following: a central processing unit (CPU), a microprocessor, a PIC processor, a Field-Programmable Gate Array (FPGA) device, a Digital Signal Processor (DSP), a computer, a server, a cloud-computing framework, and other devices capable of processing commands and data.

The processor 102 can have multiple I/O ports to accept information from multiple systems. The processor 102 can also be configured to implement various methods that are discussed in more detail below. The processor 102 can also be configured to implement other processes as are necessary for the operation of the herein described system and method. The user indication recognition system 100 can include multiple sensor devices. Non-limiting examples of possible sensing devices include visual sensors 104. Visual sensors 104 can be one or more cameras, including charge-coupled devices ("CCD") or complementary metal oxide semiconductor ("CMOS")-based devices, stereoscopic sensors, infrared (IR) type sensors (which may be used for example to sense images in a dark environment) that may be mounted about an interior of a vehicle. For example, the visual sensors 104 may be placed near a rear-view mirror in a typical vehicle. In various embodiments, the visual sensors 104 provide suitable resolution to capture and allow determination of, for example, a direction in which a user's eyes are directed, head movements, and even fine and/or quick finger movements. In one approach, the user indication recognition system 100 can contain or be coupled to multiple types of visual sensors 104 that can be physically mounted, placed, or otherwise located such that they can capture physical indication gestures of a user. For example the visual sensors 104 may be placed within the interior of a vehicle, on the front of a television display or computer screen, or within a room to capture indication gestures by a user within the viewing angle of the visual sensors 104. In one form, multiple visual sensors 104 can be positioned to observe separate portions or areas of an environment that users may or may not be occupying (such as, for example, various occupied and non-occupied portions of the passenger compartment of a vehicle). The visual sensors 104 can also be position such that they have a field of view that is limited to or includes an outer environment 206 that is outside of an inner environment 204 (see FIG. 2). By way of non-limiting example, multiple visual sensors 104 can be coupled to a vehicle to provide a field of view outside of the vehicle (the outer environment in this example) to provide a 360 degree viewing angle of the outer environment, or a partial viewing angle less than 360 degrees. The visual sensors 104 may be used to detect visual objects both in the inner environment and in the outer environment. As described, the visual sensors 104 may be part of a "machine vision" system that may also include the at least one processing device 102. Typically, the machine vision system will include at least two visual sensors 104 to be able to capture stereoscopic images. With these stereoscopic images, the processing device 102 can implement various algorithms to determine the contents of one or more captured images and be able to relate the determined images to an action, function, or feature. For example, the machine vision system may be able to capture hand gestures, finger movements, the direction in which a user is pointing or looking, or other macro- or micro-details pertaining to the user.

The user indication recognition system 100 may also include or be coupled to one or more audio sensors 106. The audio sensors 106 can be mono or stereo microphones. The audio sensors 106 can also employ or be used in conjunction with noise cancellation or active noise reduction (ANR) technology to filter ambient noise (such as, for example, road and engine noise in a vehicular setting or multi-media audio output in a multi-media setting). In one approach, the audio sensors 106 can be located within the inner environment (for example, inside the passenger compartment of a vehicle) and can be configured to capture an audio indication of a user within the inner environment. Alternatively, the audio sensors 106 can also be located within an outer environment (for example, outside of the passenger compartment of a vehicle). As described, the audio sensors 106 may be part of a voice recognition system that may also include the at least one processing device 102. Typically, the voice recognition system will be capable of recognizing spoken words and phrases, spoken utterances, humming, sung or hummed tunes, whistling, respiratory sounds, guttural sounds, clicking, clapping, snapping, and other verbal and non-verbal sounds.

The user indication recognition system 100 may also include or be coupled to one or more telemetry sensors 108. Non-limiting examples of telemetry sensors 108 can include weather sensors, traffic condition sensors (in a vehicular setting), accelerometers, compasses, or other sensors configured to measure a configuration, attitude, position, speed, velocity, orientation, steering wheel angle (in a vehicular setting), and the like. In various approaches, a given application setting may already include multiple telemetry sensors of varying types as may be required in that particular setting, which sensors may be made available to the user indication recognition system 100 as needed or requested. Additionally, the system 100 may also include or be coupled to one or more environmental sensors 110. Non-limiting examples of environmental sensors 110 can include temperature sensors, humidity sensors, illumination sensors, wind sensors, or other environmental sensors 110 configured to measure one or more environmental conditions either outside or inside the vehicle.

The user indication recognition system 100 may also include or be coupled to one or more supplementary sensors 112 as needed. Non-limiting examples of supplementary sensors can include pressure sensors, biometric sensors, voltage sensors, current sensors, capacitive touch sensors, etc. The supplementary sensors 112 can be used to supplement the other sensors of the user indication recognition system 100 by providing more detailed information where needed. It should be noted that the functions and/or physical aspects of any of the sensors described herein, such as the visual sensors 104, the audio sensors 106, the telemetry sensors 108, the environmental sensors 110, and the supplementary sensors 112, although categorized in this description as such, may be emulated, reproduced, duplicated, combined with other sensors, or categorized in a different manner than described herein while still providing the same or similarly suitable functionality.

The processor 102 of the user indication recognition system 100 may also include or be coupled to one or more communication modules 114. The communication module 114 can be used to interface the user indication recognition system 100 with a mobile device (such as a cellular phone) or other mobile communication device. The communication module 114 can also be used to communicate with other external devices or networks. In one embodiment, the communication module 114 can include a Bluetooth® communication system for communicating with cellular phones or other portable electronic devices. The communication module 114 can also communicate with external cellular networks such as those operating using LTE, 4G, 3G or other cellular communication protocols as are known in the art. The communication module 114 can also be equipped to operate using a Wi-Fi connection such as IEEE 802.11-type networks. Additionally, the communication module 114 can also be capable of receiving information from Global Positioning Satellites ("GPS"). Positional information can be received via the GPS by the communication module 114. It should be noted that many application settings for the user indication recognition system 100 may already include a communication module 114, the use of which may be made available to the user indication recognition system 100 as needed or requested.

The processor 102 of the user indication recognition system 100 can also be coupled to a larger system which the user indication recognition system 100 may be used with. Such coupling may be achieved via one or more system interface modules 116. The system interface module 116 can allow the user indication recognition system 100 to have access to information pertaining to the larger system. For example, if the user indication recognition system 100 is installed into a vehicle, information such as speed, rpm, engine temp, GPS data, Bluetooth® communication data, audio input data, etc., can be provided to the user indication recognition system 100. Furthermore, the system interface module 116 can allow for communication between some or all modules and sub-systems of the larger system and the user indication recognition system 100. Additionally, via the system interface module 116, the user indication recognition system 100 may be able control the other modules and sub-systems of the larger system. The system interface module 116 can communicate with the larger system via an industry standard communication protocol such as CAN, CAN Open, USB, serial communication, parallel communication, or any other communication protocol as is known in the art. Additionally, the system interface module 116 can detect the presence of a system output 118. The system output 118 may include the outputs of one or more modules or sub-systems that may indicate a current status of the larger system, as well as an indication of whether any user interfaces of the larger system have been activated As one contextual example, the user indication recognition system 100 may be coupled to a vehicle (the vehicle being the larger system). In this contextual example, the system interface module 116 can provide communication with an infotainment system, a navigation system, a compass, a climate control system, power windows, power locks, internal lighting, or other system as is known in the art. Further, the user indication recognition system 100 may be able to control the infotainment, climate control, navigation, and other systems. In some approaches, the user indication recognition system 100 can be limited to only controlling those vehicle systems that could not affect the safety of operating the vehicle, but may be extended to safety features as well. As stated above, the system interface module 116 may be able to detect a current status of the larger system, for example, a current status of the power window (e.g., 50%, fully closed, currently opening, currently closing) and an indication of whether the power window button is current activated (and in what direction). Similarly, in the case of a reading light, the system output may indicate a current status of the light (e.g., on, off, 50% brightness) and an indication of whether the reading light button has been pressed. These concepts apply as easily to other settings, such as a multi-media system, whereas the user indication recognition system 100 may be able to detect a current channel, volume setting, etc, and whether any settings are currently being or have recently been altered.

The processor 102 of the user indication recognition system 100 can also include or be coupled to a memory device 120. The memory device 120 can store information related to features, historical data, or other data required to operate as described herein.

Figure 2:
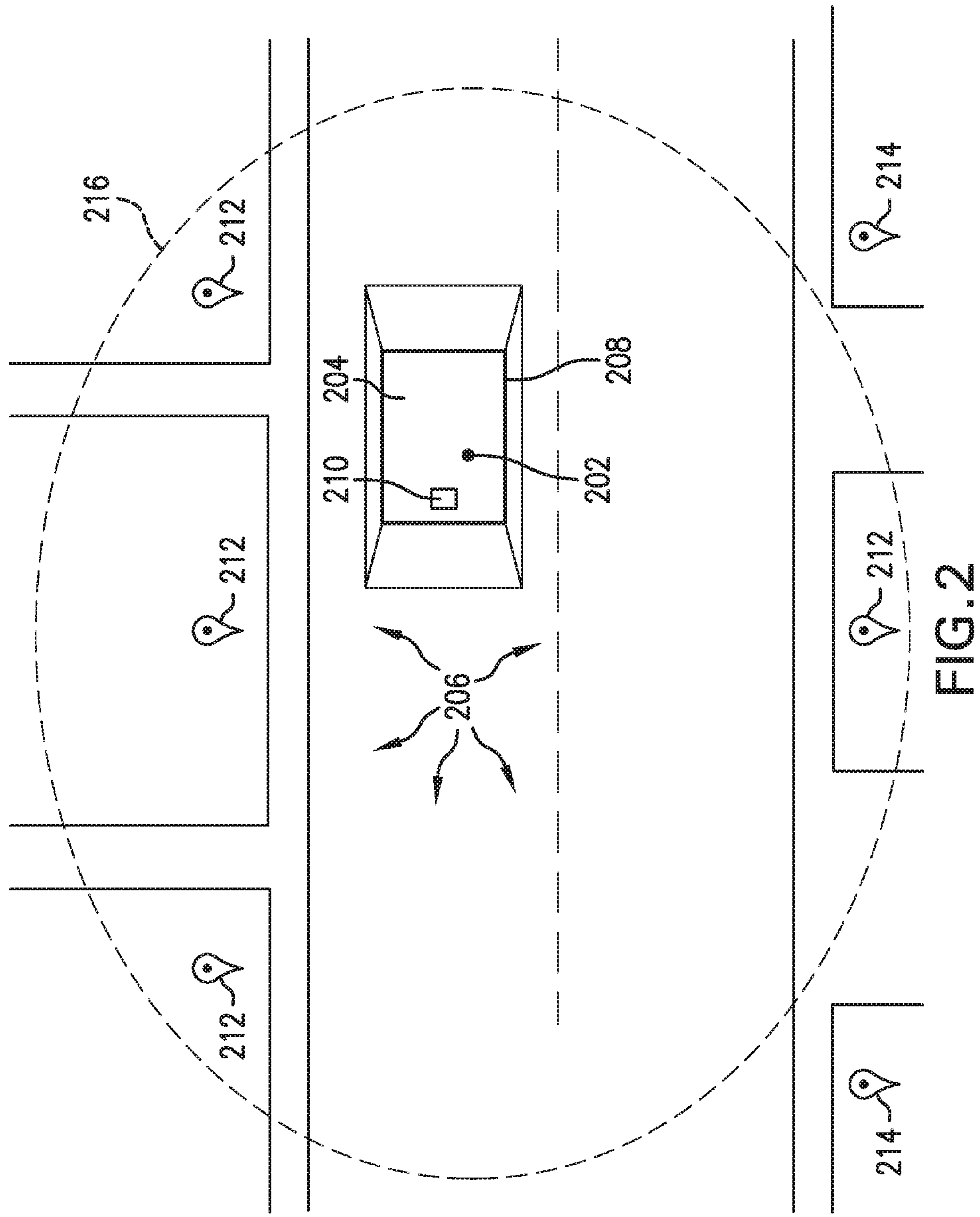
FIG. 2 is a contextual example of an application setting utilizing the user indication recognition system in accordance with various embodiments.

Turning now to FIG. 2, a contextual example of an application of a user indication recognition system 100 is illustrated. A user 202 is shown within an inner environment 204. Outside of the inner environment 204 is an outer environment 206. A boundary 208 may separate the inner 204 and outer environments 206. The boundary 208 may be a physical boundary that physically separates the inner 204 and outer environments 206, or may be a virtual or inferred boundary. For example, in a vehicular example (as is depicted in FIG. 2), the interior cabin of the vehicle may be the inner environment 204, whereas the areas exterior to the cabin of the vehicle may comprise the outer environment 206. By some approaches, areas that are part of the vehicle, but are not part of the passenger cabin (for example, the engine area or the trunk) may be included as either inner 204 or outer environment 206 dependent upon the needs or preferences associated with the specific application. Typically, though not necessarily, portions of the outer environment 206 will be further (e.g., physical distance) from the origination point of a user indication (e.g., the location of the user 202) than portions of the inner environment 204.

As mentioned above, the contextual example shown in FIG. 2 is a vehicular application of a user indication recognition system 100. Although specifically shown here in a vehicular application, the teachings described herein may apply easily in other settings, such as, for example, other vehicle types including a motorcycle, a golf-cart or other open-air vehicle, an aircraft, a train, a boat, a submarine, a space shuttle, or the like. Further, these teachings may also apply to other non-vehicular applications, such as a multimedia setting (e.g., a home theater, a computer, etc.), a home automation system, an individual room, or other settings. For example, in a multi-media setting, an inner environment 204 may include aspects that affect or relate directly to a television or multi-media system specifically (such as channel, volume, etc.), while the outer environment 206 may be related to points of interest external from the multi-media system (for example, a lighting device, the remainder of the room in which the multi-media system resides, a neighboring room, the outdoors, etc.). By another example, in a room setting, an inner environment 204 may be the interior of the room (possibly with closable doors and/or windows, or with passageways that are always open such as hallways or walkways that may separate, for example, a family room from a kitchen). In such an application, an outer environment 206 may be areas outside of the room. For example, if the inner environment 204 is a family room, an outer environment 206 may include a neighboring kitchen, dining room, bathroom, bedroom, or the outdoors.

Further still, these teachings may apply to virtual, emulated, or reproduced settings, such as, for example, a video or virtual reality depiction of any of the above described settings. For example, a vehicle interior, aircraft cockpit, or a room depicted in a video game may constitute an inner environment 204 while areas depicted outside of those settings may constitute the outer environment 206. By another example, a remote control station controlling an actual vehicle or device (for example, a drone vehicle or aircraft, a robotic device, a submarine, a bomb-disposal robot, or other remote-controllable devices) may provide a similar application as the video game application described above, though one or both of the environments may correspond to actual physical environments rather than virtually created environments. In such an application, the real environment may be physically remote from a user (such as a user of a remotely controlled drone viewing a remote, yet actual physical environment in which the drone is driving or flying). By one example, an inner environment 204 for a user of a remote control station may be a virtual or emulated environment (be it displayed visually or not) used to control the remote device (for example, by using hand gestures), whereas the outer environment 206 may be the reproduced images provided by the remote device to the user at the remote control station. In such an application, although the user 202 is physically remote from the point of reference for the outer environment 206, that point of reference is established virtually via the interaction between the remote control station and the remotely controlled device.

Certain boundaries 208 may be virtual. For example, continuing with the contextual vehicular example of FIG. 2, if a window is rolled down or a convertible top is folded down, then a physical boundary is no longer present to delineate the inner 204 or outer environments 206. However, in such an instance, a boundary 208 can be inferred as the location where the window or convertible top would normally reside. Similarly, in open-air applications (such as motorcycles, golf carts, go carts, ATVs, boats, jet skis, cable cars, or any other vehicle or non-vehicle application that can be open-air), a boundary 208 separating inner 204 or outer environments 206 may be inferred or virtually created based on the needs and conventional wisdom associated with each specific application. For example, with a motorcycle, the inner environment 204 may include only areas required to interface with and/or control the motorcycle and its systems directly, whereas all other areas may constitute the outer environment 206. In such an application, the boundary 208 will be set accordingly despite the lack of a physical boundary.

Further still, by some approaches, the boundary 208 between the inner 204 or outer environments 206 may not correspond directly or entirely to a physical boundary and may instead correspond to a functional delineation. For example, with respect to the motorcycle example above, the inner environment 204 may correspond only to user indications correlating to functional interactions with the motorcycle and its systems (such as turn on a blinker, turn a radio down, etc.), where as all other user indications will be considered to be relating to points of interest within the outer environment 206. By other approaches an inner environment 204 may be defined as items or functions that may be continuously available to a user 202 or are in a steady-state (for example, the systems and features relating specifically to a vehicle) where as the outer environment 206 may be defined as points of interest that are continuously evolving or are evolvable.

With continued reference to FIG. 2, various Points of Interest (POI) may be present in any given application setting. For example, a POI 210 may be within the inner environment 204 and may relate to a system of a vehicle (such as the infotainment center, navigation, climate control, etc.) with which a user 202 may wish to control, inquire about, or interface with. Additionally, other POIs 212, 214 may exist in the outer environment 206. These may correspond to locations (such as addresses, buildings, parks, rest areas, etc.), businesses (such as stores, gas stations, retail shops, restaurants, hotels, etc.), roads or streets, objects, or any point of interest 212, 214 about which a user may wish to inquire or provide a command.

Figure 3:
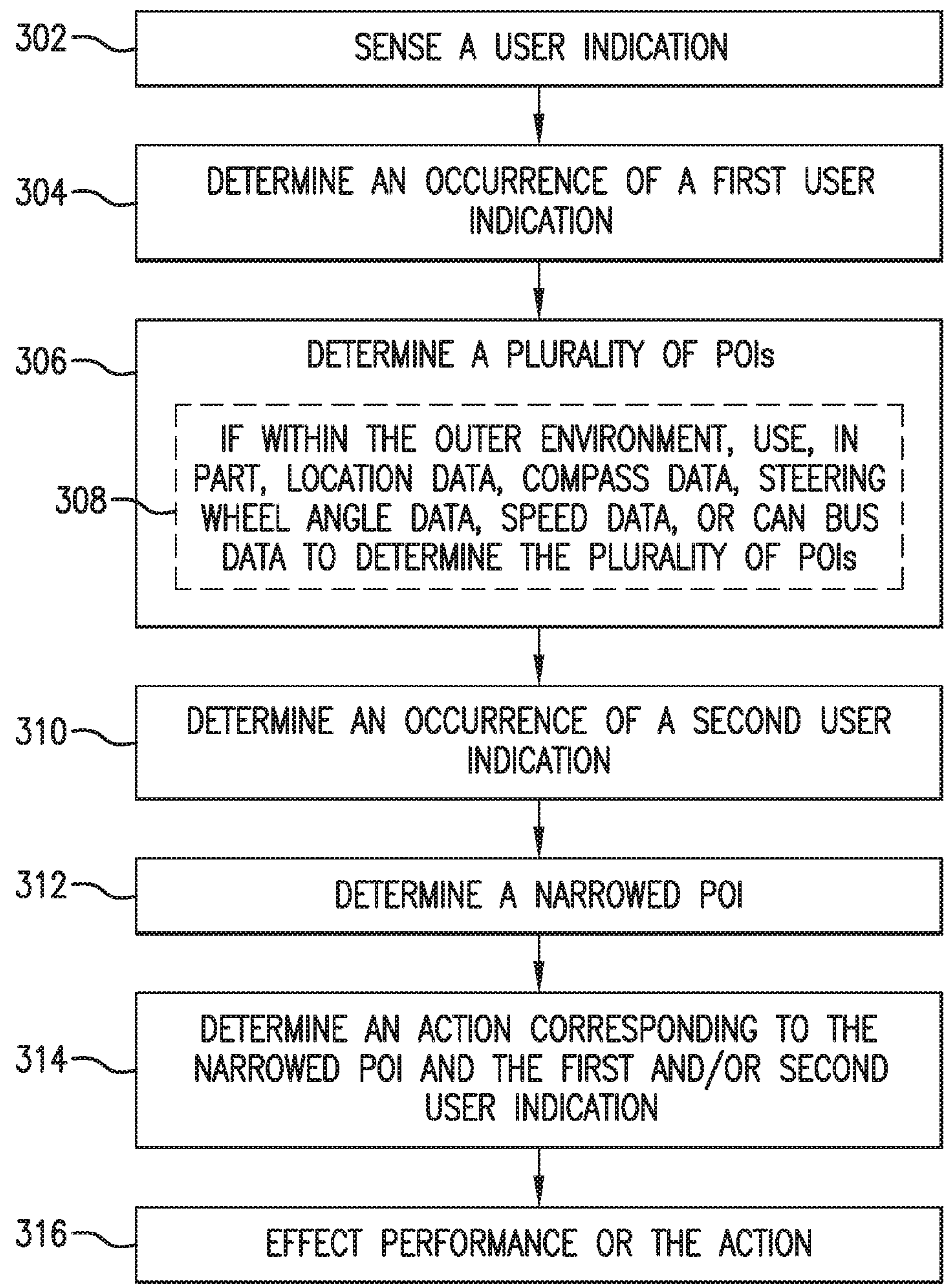
FIG. 3 is a flowchart depicting a method corresponding to the user indication recognition system in accordance with various embodiments.

Turning now to FIG. 3, a flow chart illustrating a method 300 for recognizing user indications is provided according to at least one approach, which method the at least one processing device 102, sensing devices, or other disclosed devices may be configured to perform in part. At step 302, a sensor device senses at least one first user indication. The first user indication can include either or both of an indication gesture (for example, a finger point) or an audible indication (for example, a spoken command). At step 304, the processing device that is communicatively coupled to the sensor device determines at least one occurrence of the first user indication. As stated above, such determination can be achieved through various algorithms and processes as are known in the art that are designed to determine the occurrence of such user indications. For example, the processing device 102 may be configured to analyze an orientation of a finger in 3-dimensional space (for example, it's plane, angle, direction, etc.).

At step 306, the processing device 102 may determine a plurality of POIs corresponding to the first user indication. For example, the processing device 102 may determine a plurality of POIs based simply on a general direction in which an indication gesture was made, or based on criteria of an audible indication.

By one approach, the processing device may determine whether the user indication corresponds to at least one POI within the inner 204 or outer environment 206 (e.g., step 402 in FIG. 4, discussed below). For example, the processing device 102 may determine or identify a plurality of POIs 210 within the inner environment 204 when the processing device 102 determines the user indication corresponds to at least one POI within the inner environment 204. Conversely, the processing device 102 may determine or identify a plurality of POIs 212, 214 within the outer environment 206 when the processing device 102 determines the user indication corresponds to at least one POI within the outer environment 206. At this point, further disambiguation may be required to determine one or more narrowed POIs to which the user was indicating.

Optionally at step 308, in one approach, (possibly if the processing device 102 has determined that the user is referring to a POI in the outer environment 206) the processing device 102 may take into account other data to make a determination as to the plurality of POIs (or to a particular POI) to which the user is referring. For example, by one approach, the processing device 102 may use, at least in part, location data (for example, GPS data), compass data (for example, to determine a vehicular orientation), steering wheel angle data (for example, to determine a current directional vector in which the vehicle is traveling or has traveled), speed data (for example, to determine a POI which the user may have recently passed), CAN bus data (for example, to determine other relevant vehicular or system settings that may be pertinent to the POI determination), a time of day, a direction of travel, or any other relevant data that may be pertinent to the plurality or a particular POI determination.

At step 310, the processing device may determine an occurrence of at least one second user indication in response to determining the plurality of POIs. In at least one example, the first user indication may be an indication gesture (along or with other indications), whereas the second user indication may be an audible indication, however the opposite may be true in other examples. In one approach, the further user indication may be a fine user indication whereas the initial user indication may have been a coarse user indication. For example, a coarse user indication may be a finger point, a hand directional indication, or a head nod. However, a fine user indication may constitute much finer movement such as moving a finger up or down slightly (possibly while keeping the arm steady). Such a finer action may, for example, correspond to navigating a menu or scrolling through a list of a plurality of possible POIs. This coarse-to-fine user indication approach is congruent with a process of culling a plurality of possible POIs down to a single or few narrowed POIs and is discussed through the disclosure.

At step 312, the processing device 102 can determine one or more narrowed POIs from the plurality of POIs (possible using the coarse-to-fine user indication approach described above, or with other approaches, such as question and answer). At step 314, the processing device 102 can determine at least one action corresponding to the at least one narrowed POI and the first and/or second user indication.

For example, in a vehicular setting, a user may provide a coarse indication by pointing or gesturing in a general direction. The processing device 102 may then effect the display of a plurality of POIs that correlate to the general direction to which the user was pointing (within the inner environment 204, within the outer environment 206, or within both) on a display such as the infotainment center. Such displaying may include selecting and/or highlighting a set of POIs that may or may not already be present on the display, and may further include removing or excluding from the display POIs that are not in the general direction indicated. Then, in a subsequent step, a user may perform finer indication gestures (such as flicking a finger) to choose from the plurality of POIs to select one or a few narrowed POIs. In various approaches, the determination of a particular POI may utilize a multi-channel data approach that may include an accurate depth mapping scheme, color recognition (for skin tone, gloves, etc.), head tracking, eye tracking, and voice recognition. The combination of these various factors results in a more robust system.

Either or both of the plurality of POIs or the at least one narrowed POI may be determined (in steps 306 or 312) using environmental data, a time of day, a present location, a known location, information about one or more present users, a user setting, a historical record of POIs, or other factors that may be relevant to the selection of the plurality of POIs. For example, in a search setting, a user may make an audible indication stating "show me places to eat." Such a request for POIs may result in a larger number of POIs being returned in a set of search results. The results may include restaurants, grocery stores, coffee shops, and the like. In response, the system may analyze the plurality of POIs that were returned by the initial search to identify at least one narrowed POI, thereby facilitating the user's search. For example, the system may make a determination that the current time is closer to dinner time rather than lunch time, and may make a further determination that, based at least in part upon the time, that the user wishes to view a listing of sit-down restaurants as opposed to fast-food locations (whereas the user may be more inclined to visit a fast-food location during breakfast or lunch hours) or coffee shops. The system can then determine the plurality of POIs (restaurants in this example) or the narrowed set of POIs by selecting only sit-down restaurants and providing only those POIs in a result set to the user. Similarly, the system may make a determination as to whether children are present within the vehicle (e.g., by detecting the presences of smaller individuals, the presence of car seats or booster seats, or the mere presence of occupants in the rear seats), and may determine that the requesting user only wishes to see fast-food locations or family-friendly restaurants, in which case only such POIs will be returned in response to the user's search. These determinations may be made automatically by the system, in which case a filtered set of POIs will be returned to the user. Or, alternatively, the system may indicate to the user that the requested search has identified a large number of POIs and can prompt the user to filter the POIs to identify a narrowed set of POIs. For example, the system may inform the user that the time is close to dinner time and may inquire as to whether the user would want to filter the results in a search for "places to eat" to only restaurants suitable for dinner.

Similarly still, the system may review a historical database (possibly stored in the memory 120) that may provide additional information that may be used (possibly in conjunction with other information) to make the determination of the plurality of POIs or the narrowed POI. For example, the system may recognize a trend in the historical database that when the user executes a particular search that generates a large number of candidate POIs, the user tends to ultimately select one particular type of POI. For example, the historical database may store information describing prior searches for restaurants. That historical data may indicate that the user, when executing a search for "places to eat", almost always selects a fast-food POI instead of a sit-down restaurant. Similarly, the system may determine from the historical database that when a user makes such a request and is over 20 miles from home, the user always selects a fast-food option, but when within 20 miles from home, almost always selects a sit-down restaurant. After analyzing the data stored within the historical data to make a determination as to whether the results of a particular search can be filtered to generate a narrowed set of search results in this manner, the system may automatically filter the results based upon that prior behavior, or can prompt the user to filter the results in accordance with their prior behavior. Once prompted, the user can then select to filter the results or to view the full set of results including all POIs that match the search request.

Accordingly, the system can use any of these factors in generating various interactive prompts, questions, or options output to a user to aid in selecting one or more narrowed POIs. For example, after a plurality of POIs are identified, the system may ask a user if they are looking for sit-down restaurants because the system knows that when it is closer to dinner time, the user may be searching only for sit-down restaurants as opposed to fast-food restaurants. Further still, the system may order or weight a plurality of POIs in a similar manner to aid the user in making further selections or indications to select the narrowed POI (e.g., placing sit-down restaurants at the top or first in a list as the system understands the user's general preference for sit-down restaurants).

In another example, the system may alter how a plurality of POIs are selected and/or presented to a specific user making the request or command based on the user. Such determinations may be based on a user's current role (e.g., driver or passenger), age, physical location within an environment, disability, or other factors. For example, if a driver inquires about a place to eat, the system may provide very aggressive limitations on the number of POIs presented in a plurality of POIs as compared to if a passenger makes a request. This may be to limit the presented results to a lower number to prevent distracting a driver from the road (visually or mentally) for too long. Conversely, if a passenger makes the request, a larger pool of POIs may be presented as their safety will not suffer for reviewing a larger plurality of POIs.

By another example, a user may point out a window toward a garage door and state "open that." The system may determine that the user is indicating either to open the window, unlock the door, or open the garage door (e.g., a plurality of POIs) and may present that plurality of options to the user. The system may prompt the user to make a selection between the three options to choose the narrowed POI (the garage door in this instance). However, the system may know based on, for example, the historical database that when a current location of a vehicle is within 100 feet of a home address the user almost always wants the garage door opened. In that case, the system may then present the garage door option as the first option to the user. In another form, the system may just make the final determination that the user meant to open the garage door and perform that task rather than (or possibly in addition to) presenting the user with the plurality of POIs.

It will be readily understood by those of skill in the art that the user indication recognition system 100 can use any number or combination of factors in determining the plurality of POIs or in determining the at least one narrowed POI. These factors are not limited to the above described factors and methodologies, nor are they limited to being used in the ways in which the above examples have been described. Such factors and methodologies may be design and/or setting specific such that various factors and methodologies may be employed in this regard, which variations are fully contemplated by this disclosure.

In conjunction with steps 310 and 312, in some embodiments, after determining the plurality of POIs corresponding to the first user indication in step 306, the system can turn off one or more potential POI targets to facilitate the refinement of the plurality of POIs into the narrowed set of POIs. For example, if, in step 306 a plurality of POIs are identified that are each outside of the vehicle, potential POIs that may reside within the vehicle (e.g., POIs associated with the vehicle's entertainment system, air conditioning system, power windows, and the like) may be disabled in conjunction with step 310. This ensure that the user's second indication (in some cases, a finer indication gesture), which is intended to refine the set of POIs identified in step 306 does not inadvertently refer to or otherwise indicate one of the POIs inside the vehicle.

Similarly, when the first user indication determined in step 304 indicates a direction towards a number of potential POIs (e.g., the user indication could be a pointing finger), the system may select and highlight POIs in only that direction, with all other POIs being disabled or otherwise ignored. Having selected only POIs in the direction indicated by the user, the user can then proceed to choose from the more refined set of POIs a narrowed set of POIs, perhaps based on a voice command. The voice command could, in turn, highlight an even smaller subset of POIs, and finally, a single POI may be chosen from a narrowed down subset with a pointing gesture, or an even finer gesture.

Returning again to FIG. 3, at step 314, the processing device 102 can determine at least one action corresponding to the at least one narrowed POI and the first and/or second user indication. Continuing with the vehicular contextual example used throughout, if a user pointed at a window and made a rolling motion with their finger, the processing device 102 could make a determination based on both the determined POI (window) and the user indication (pointing and rolling motion) that the corresponding action is to roll up or roll down the window. Similarly, if a user points to a restaurant at the side of the vehicle and states "remember that," the processing device 102 can make a determination based on both the determined POI (restaurant) and the user indication (pointing and audible command) that a corresponding action may include saving the location on notes, calendar, checking-in to the location, or even making a reservation. By one approach, a voice prompt or interactive display screen may be able to aid a user in performing further actions.

At step 316, the processing device 102 may effect performance of the action determined in step 312. For example, the processing device 102 may communicate with a different system through the system interface 116 to effect the action (e.g., communicate with a window control module to effect rolling up or down of the windows, or communicate with a navigation system to alter a navigation route, etc.). The processing device 102 may also communicate through the communication module 114 to one or more other devices to effect the action (for example, communicate to a mobile device via Bluetooth® to make a phone call, edit a calendar entry, or text a friend the user's present location). It should be understood that the processing device 102 itself may actually perform the action (e.g., an action to disable the user indication recognition system 100), while other situations may involve the processing device 102 interfacing or communicating with one or more other systems to effect performance of the action.

Different actions can be determined and effected according to various approaches. In one approach, as mentioned above, a user can provide a command to save a POI 212, 214 location. By another approach, the processing device 102 can determine an action to retrieve and provide additional information about a POI. For example, a user may state "what is that" while pointing toward, nodding toward, or looking at a POI 212, 214 in an outer environment 206. The processing device 102 may then retrieve information about the POI, possible from third-party information providers (e.g., Yelp®, Zagat®, Yellow Pages®, etc.), and provide such information (e.g., store hours, ratings, overview, etc.). By another approach, a user may indicate a POI and state "Is [friend's name] here?" The processing device 102 may then determine whether the friend is there (e.g., if the friend has a device that broadcasts their present location) by known means, including, for example, by communicating with the user's mobile device to make such a determination.

In further approaches, the processing device 102 can effect actions relating to a navigation system by indicating POIs in the outer environment 206. In one example, a user may point to another vehicle (e.g., a disabled or crashed vehicle) or other obstacle (e.g., debris or potholes in a roadway) and identify it has a road hazard. The processing device 102 may then cause the navigation system to mark the hazard as such and/or communicate the hazard to other individuals or services that would benefit from such information. In another example, a user may alter a navigation route on the fly by pointing to a different street and asking, for example, "Can I take a left here to avoid the accident?" The processing device 102 may then effect an action to, for example, compare the suggested route with traffic information that is available (possibly to a vehicle or a coupled mobile device) to determine if the proposed route is good (e.g., meets certain criteria).

In even further approaches, the processing device 102 can effect actions relating to controlling other devices or appliances that are not typically coupled to the user indication recognition system 100. For example, a user may pull up to a movable barrier (such as a garage door or a gate) and point to the movable barrier and state "open the door." In response, the processing device 102 may effect operation of a movable barrier operator (e.g., garage door opener or gate operator) to open the barrier. The barrier operator may be communicatively linked to the system (e.g., the user indication recognition system 100, or a larger system to which the system 100 is coupled). This same principle applies to other remote appliances, such as, for example, lighting controllers, alarm system, and other home-automation systems.

In one form, the user indication recognition system 100 may be used to control aspects of the larger system (e.g., a vehicle, home-theater, etc.) while the user is in the outer environment 206. For example, a user may be outside of a vehicle and point to the vehicle and state "lock it" or "unlock it." The user indication recognition system 100 may recognize the speaker through various voice recognition techniques or by using other biometric recognition or authentication techniques (e.g., an authenticated key fob) to validate the user as a user with authority to provide the command. A similar situation may apply in home-theater settings if a user walks out of the room and into an outer environment 206 and states, for example, "pause" or another command. The processing device 102 may determine to effect the action even though the user is not physically present within the inner environment 204.

In still other approaches, the processing device 102 can effect performance of actions relating to controlling or inquiring about aspects or features of the larger system to which the user indication recognition system 100 is coupled (e.g., a vehicle, etc.). In one example, and continuing with the contextual vehicular example, a user can point at the radio and inquire "who is this?" In response, the processing device 102 may effect performance of an action that shows the current song title, artist, etc. on a display screen, and/or possibly provides an audible version of the same information. Other examples include pointing at a navigation screen when a traffic warning appears to cause the system to read the traffic warning out loud, or pointing to a vehicle warning light when it appears to provide the user with additional information as to what the warning means and how to remedy it.

By further approaches, the processing device 102 can effect performance of actions relating to inquiring about individual contacts or friends. In one example, and continuing with the contextual vehicular example, a user can point at the navigation system and say "Show my [contact's name]." The processing device 102 can then effect performance by the navigation system to, for example, bring up the contact location information. In response, a user can initiate further actions through the user indication recognition system 100 or through the navigation system directly. Such possible further actions may include but are not limited to calling or sending a message to the contact or sending the contact's current location with live updates or the contact's saved location to the user's or the contact's friends.

Figure 4:
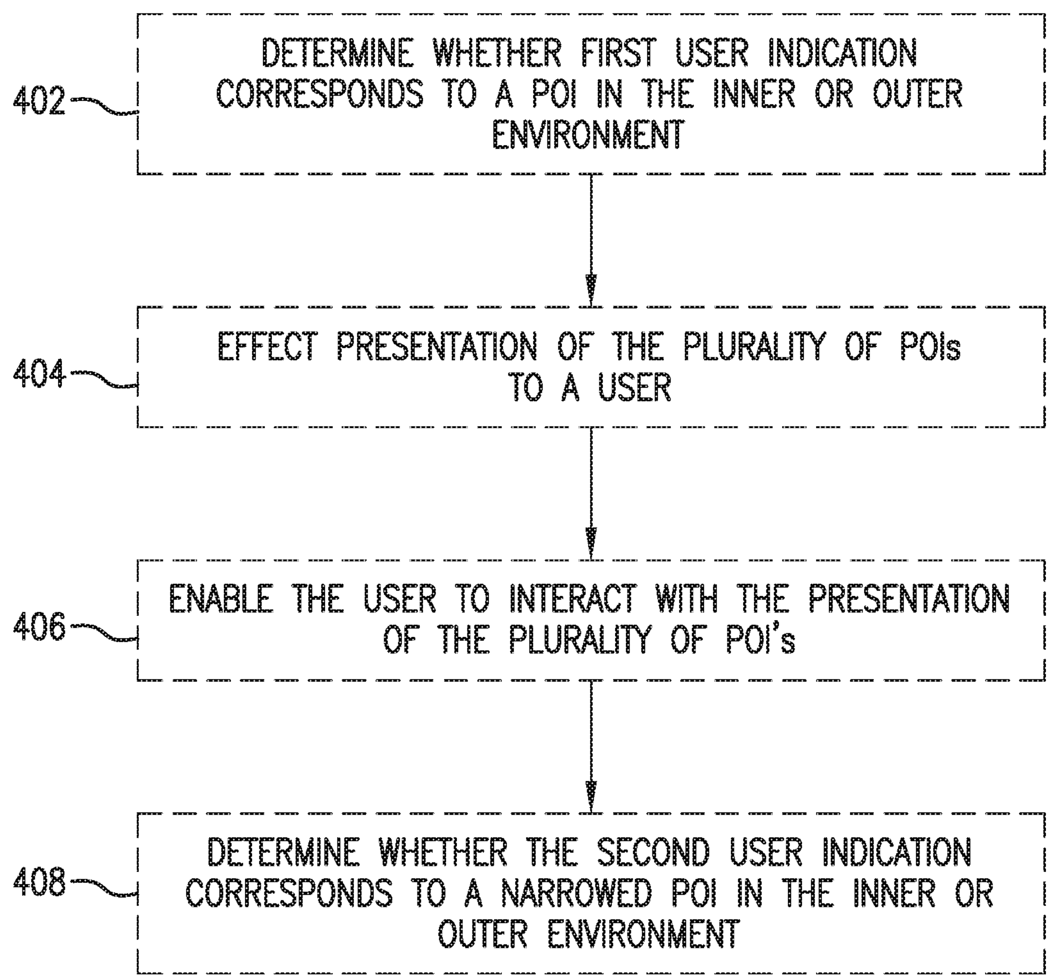
FIG. 4 is a flowchart depicting additional method steps corresponding to the user indication recognition system in accordance with various embodiments.

Turning now to FIG. 4, optional additional method steps 400 are described in accordance with various approaches. Such method 400 may be performed in conjunction with the method 300 of FIG. 3, and may also be performed, at least in part, by the processing device 102. These method steps may be performed in conjunction with each other or independent of each other.

At optional step 402, the processing device 102 may determine whether a user indication (such as the first user indication) corresponds to at least one POI within an inner environment 204 or at least one POI within an outer environment 206. In one form, this step may be performed as part of step 306 of the method 300 of FIG. 3. For example, with brief reference to FIG. 2, the processing device 102 may determine whether the user 202 is referring to a POI 210 within the vehicle (e.g., inner environment 204), or one or more POIs 212, 214 outside the vehicle (e.g., outer environment 206).

Figure 5A:
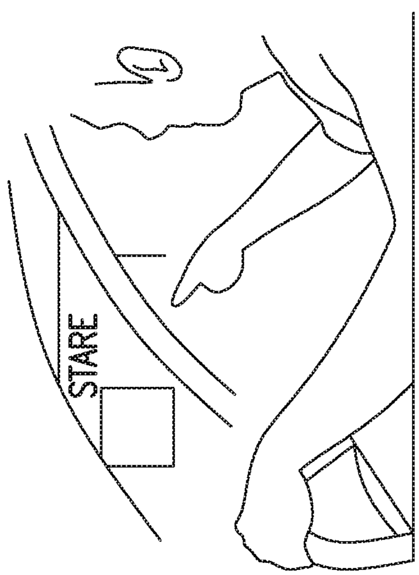
FIGS. 5A-5D are illustrations showing various features of the user indication recognition system in accordance with various embodiments.
Figure 5B:
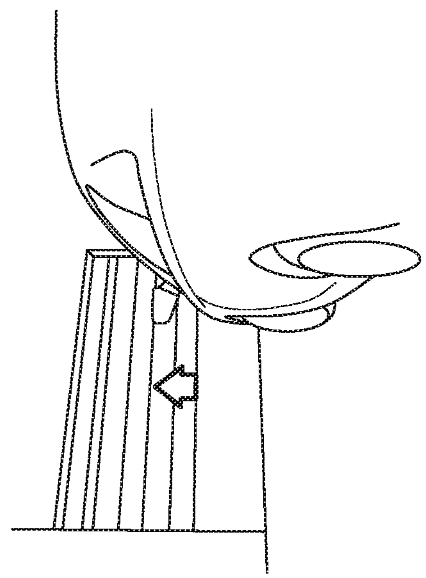
Figure 5C:
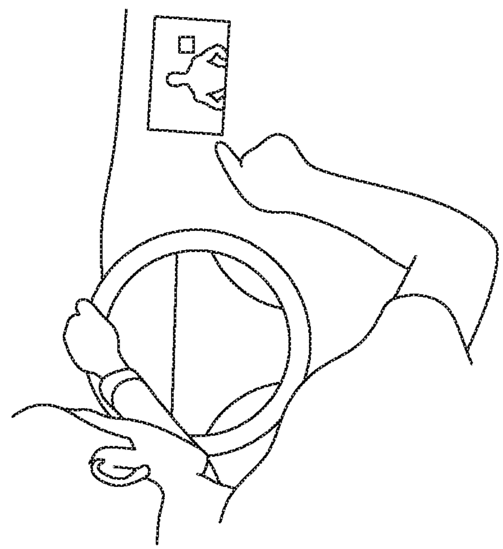
Figure 5D:
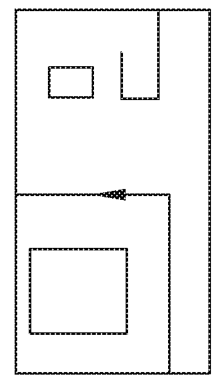

By one approach, a determination of whether the user indication corresponds to a POI within the inner 204 or outer environment 206 can be made by determining a known relationship between the user indication and a specific POI. For example, if a user points directly to the infotainment center of a vehicle, as is illustrated in FIGS. 5C and 5D, or gives a spoken command relating directly to the radio or the climate control, the processing device 102 can determine that the user 202 is referring to a POI 210 within the inner environment 204. By another approach, continuing with the vehicular example, if the user 202 makes an indication gesture generally aimed toward the dashboard, seats, floor, interior side panels of the doors, or toward other areas of the interior of a vehicle that may obstruct a view of the outer environment 206, the processing device 102 may be able to infer that such an indication gesture is generally relating to a POI within the inner environment 204. This may be because a user may not point to or gesture toward a POI 212, 214 in the outer environment 206 that the user cannot see. Further, from a user's perspective in 3-dimensional space, POIs may not generally physically exist below a user's sight-line because the sight-line will typically extend downward toward the ground within a few feet of the vehicle (except possibly for POIs including a current road on which the vehicle is traveling or a current location at which the vehicle is located). Typically, though not always, POIs 212, 214 in an outer environment 206 may exist on the same horizontal plane as a vehicle or higher (e.g., a store on the side of the road or an office in a tall building). Thus, a user may point sideways or forward out of a window at a POI 212, 214 located in an outer environment 206, which by one approach, the processing device 102 can use in determining whether the POI is within the inner 204 or outer environment 206. Such an indication gesture is illustrated in FIG. 5A. In such an approach, the processing device 102 may need to determine whether the user 202 is referring to the POIs 212, 214 in the outer environment 206 or the window, windshield, or door as part of the inner environment 204. However, these determinations can be made by any number of methods. For example, the processing device 102 may take into account whether a user's eyes are also directed toward a potential POI which the user is gesturing to (as the user may not look at a window when making a gesture pertaining to the window as the user always knows where the window is, but may look at a POI 212, 214 that is in the outer environment 206 as it is catching the user's immediate attention. In another method, a user's lips may be tracked and speech associated with a given command may also be extracted. By tracking the lips of a user, the system is able to mitigate false positives in voice commands, while limiting commands associated with gestures to ones that are actually being uttered, i.e. when the users lips indicate that the user is speaking or generating a command.

By another approach, the processing device 102 may take into account the actual indication gesture or the content of the audible indication when determining if the user is referring to a POI within the inner 204 or outer environment 206. For example, a user may point at the window and make, for example, a rolling motion with the finger tip, indicating to roll the window up or down, in which case the processing device 102 may determine that the POI is the window, which is within the inner environment 204. However, a user may point toward the window with a different gesture motion that may indicate a POI in the outer environment 206 (for example, a pointing action that typically communicates "go further," or a repeated pointing motion). As will be understood by those of skill in the art, any number of indication gestures can be utilized that the processing device 102 can be configured to use to distinguish between POIs within the inner 204 or outer environment 206.

By another example, a user 202 may speak an inquiry or command that is typically related to a POI 210 within the inner environment 204 (for example "turn on radio"), in response to which the processing device 102 determines that the POI is within the inner environment 204. Conversely, a user may speak an inquiry that would typically refer to a POI 212, 214 within the outer environment 206 (for example, "what is that?" or "remember that"). By using such an audible indication, the processing device 102 determines that the POI is within the outer environment 206 and can proceed accordingly. In such an example (having only an audible indication), the processing device 102 may also utilize other driver data possibly to determine whether the audible indication refers to something in the inner or outer environments, or to determine the specific POI to which the user is referring. For example, the processing device 102 may refer to the direction in which the user's eyes are looking or were looking immediately before or after the audible indication. As will be understood by those of skill in the art, any number of audible indications can be utilized which the processing device 102 can be configured to use to distinguish between POIs within the inner 204 or outer environment 206.

By yet another approach, the processing device 102 may receive a user indication that includes both an indication gesture and an audible indication. In one example, a user may point to a POI and simultaneously (or within a defined window of time before or after the gesture) state a command or inquiry. For example, and continuing with the vehicular example setting, a user may point toward a restaurant (POI 212) as the vehicle is stopped or passing near it and state "remember that." By this combination of a gesture indication and an audible indication, the processing device 102 will have additional data by which to make a determination as to whether the referenced POI is in the inner 204 or outer environment 206.

The processing device 102 may determine at least one POI (or a plurality of POIs) within the determined environment. For example, the processing device 102 may determine at least one POI 210 (or a plurality of POIs 210) within the inner environment 204 when the processing device 102 determines the user indication corresponds to at least one POI within the inner environment 204. Conversely, the processing device 102 will determine at least one POI 212, 214 (or a plurality of POIs 212, 214) within the outer environment 206 when the processing device 102 determines the user indication corresponds to at least one POI within the outer environment 206. Such a determination may be made simply by determining one or more particular POIs 210 within the inner environment 204 that the user is specifically addressing or that the user is specifically gesturing toward. Further, such a determination may be made by selecting one or more POIs 212 within an outer boundary 216 (discussed further below) if the outer environment 206 is indicated. However, by one approach, if a directional indication is provided (e.g., a finger point, hand gesture, head nod, eye movement, etc.), the processing device 102 may be able to select a particular one POI or a set of POIs within the outer environment 206. In certain forms, the at least one processing device 102 compares and/or matches user indications to a POI database to select the one POI or a set of POIs (which POI database may be stored locally, such as at a vehicle, possibly in the memory 120, or may be stored remotely, such as in the cloud or at a server).

With continued reference to FIG. 4, at step 404, the processing device 102 may effect presentation of the plurality of POIs to the user. For example, the processing device 102 may effect a visual representation of the plurality of POIs on a display device (e.g., by listing a number of potential POIs on a display screen) or effect an audible representation of the plurality of POIs (e.g., by using a voice synthesizer to name the potential POIs to the user). Many known variations regarding presenting the plurality of POIs to a user are possible, all of which are within the ambit of the present disclosure.

At step 406, the processing device 102 may enable a user to interact with the presentation of the plurality of POIs. In some cases, the processing device 102 may question the user as to which of a number of POIs was referred to by the user. The user may provide a further second indication to the processing device 102 to indicate which POI was actually being referred to. For example, the user could speak the name of the desired POI, hold up a number of fingers identifying the desired POI, or otherwise provide some form of indication back to the processing device 102 identifying the desired POI. Many variations are possible for interacting with the system to provide a second user indication, all of which are within the ambit of the present disclosure.

In a similar fashion to step 402, by step 408, the processing device may determine whether a user indication (such as the second user indication) corresponds to at least one narrowed POI within an inner environment 204 or at least one narrowed POI within an outer environment 206. In one form, this step may be performed as part of step 312 of the method 300 of FIG. 3. For example, with brief reference to FIG. 2, the processing device 102 may determine whether the user 202 is referring to a narrowed POI 210 within the vehicle (e.g., inner environment 204), or one or more POIs 212, 214 outside the vehicle (e.g., outer environment 206).

In various embodiments of the present system, searches for candidate POIs will occur within a target search region. Because, in the majority of instances, the POI search will be performed in response to a positional indication made by the user (e.g., by pointing a finger towards a region in which a particular POI may be located), a default target search region may be defined that is in relative proximity to the user.

The default search region may be defined as having any suitable shape (e.g., circle, ellipsis, square, rectangle, sphere, cube, and the like) to encompass a desired 2-dimensional or 3-dimensional space. The search region may encompass the user or may not encompass the user. FIG. 2, for example, shows an example default search region having outer border 216. The default search region is defined about the inner environment 204 (here, being the interior of a vehicle) and enables an operator or passenger 202 within vehicle to search for POIs in proximity to the vehicle.

The defined outer border 216 of the default target search region may vary based upon the application of the present system. Where the user 202 resides within a vehicle, the outer border 216 of the default target search region may be a circle having a radius of 100 meters from the user (e.g., to include POIs that the user may be able to see from the vehicle). Similarly, where the system is being used in a home or office building, however, the outer border 216 of the default search region may be a circle having a radius of 10 meters away from the user, again to include POIs that the user can see. The default search regions can be defined by the user or can be system-defined. The optimal default search regions can be selected based upon experimental data (e.g., by analyzing real-world POI searches and the result location of correctly-identified POIs in response to those searches).

Even though a default search region may be optimized, there can be many circumstances that, depending upon the user's current activity or current location, can invalidate or make non-optimal the default search region. For example, where the present system is utilized within a vehicle, a default search region that is well-optimized for city driving where candidate POIs are densely populated may be entirely inadequate in a region that is sparsely populated and where candidate POIs are spaced apart. Where the default search region is optimized for city driving, a POI search executed in a sparsely populated region may return too few POIs to make for an effective search. Similarly, a default search region that is optimized for a sparsely populated region may return far too many POIs for a search executed within a densely populated city location.

Accordingly, in an embodiment of the present system, the outer border 216 of a particular search region can be automatically adjusted for a given POI search to improve the number of results returned to the user. For example, when the user and the system are in a vehicle located in an area having a high density of the searched item(s), i.e. POIs 212, 214, the system may keep its default search radius (which could, for example, be optimized for city driving). However, if the system is in an area with a low density of the searched items (e.g., a rural area), the system can increase the search radius until the system can find a desired number of results. The system can do this by implementing an algorithm to determine when to increase the radius for a particular set of search results.

Figure 6:
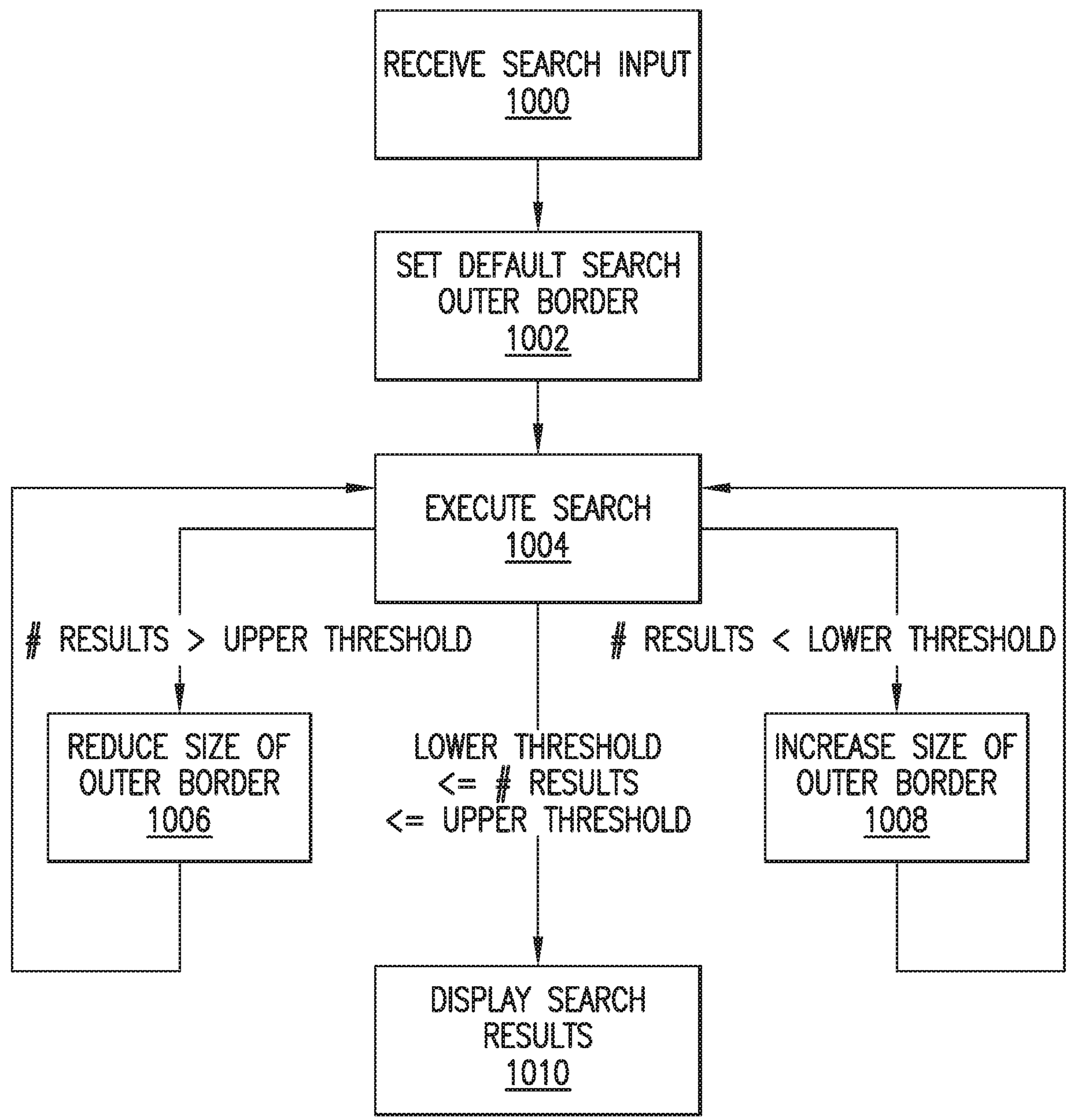
FIG. 6 is a flowchart depicting yet an additional method corresponding to the user indication recognition system in accordance with various embodiments.

FIG. 6, for example, is a flow chart illustrating a method for optimizing an outer border of a search region for a given POI search. In step 1000, the system receives a search input. The search input, as described herein, may comprise any suitable input provided by a user to search for a particular POI. The search input may include an indication gesture (such as a pointed finger) and/or additional input (such as a audible indication, for example, a search command). The search input enables the present system to search for POIs that match the search input.

Having received the search input, in step 1002 the system may define a default search outer border 216. The default search outer border 216 may be defined by user settings or specified as part of a system setting. In some cases, different default outer borders 216 may be defined for different types of searches. For example, if the search is for a place to eat (e.g., a search for a restaurant), the outer border 216 may have a different size and/or shape than if the search was for a gas station. The default search outer border 216 may be affected by user preferences. For example, the user may specify that the outer border 216 should be larger if the user profile indicates that the driver prefers freeways over local streets. Other factors affecting the default outer border 216 may include a user profile, a current location, a type of search (e.g., restaurants vs. gas stations), a threshold value (e.g., an expectation to receive between 3 and 6 results every time), a border shape, a type of current road (i.e., city street vs. rural road), a time of day, as well as other factors.

Having set the default search outer border 216, in step 1004 the system executes the search for POIs residing within the default search outer border 216. Having executed the search, a number of POIs are returned in response to the executed query. The system then determines whether the number of POIs returned in the search results is adequate.

If the number of results falls is greater than an upper threshold (indicating that too many POIs were returned in the search results, potentially overwhelming the user), the system, in step 1006 reduces the size of the search outer border 216 to generate a modified outer border 216 comprising a contracted outer border 216. Having reduced the size of the outer border 216, the search is then re-executed in step 1004 within the modified outer border 216. Now, with the size of the outer border 216 reduced, the number of POIs that may be returned in the search results should decrease and be more manageable to the user.

If the number of results falls below a lower threshold (indicating that insufficient POIs were returned in the search results), the system, in step 1008 increases the size of the search outer border 216 to generate a modified enlarged outer border 216. Having increased the size of the outer border 216, the search is then re-executed in step 1004 within the modified outer border 216. Now, with the size of the outer border 216 increased, the number of POIs that may be returned in the search results should increase.

If, however, the number of results in the search results falls between the lower and upper threshold, that indicates that an appropriate number of results were returned. As such, in step 1010, the results can be displayed or otherwise presented to the user for review.

According to the method depicted in FIG. 6, the size of the search region could be iteratively adjusted—either increased or decreased a number of times—to achieve the desired number of search results. For example, after the first time the size of the outer border 216 is adjusted (either increased or decreased) if the number of results returned in the re-executed search does not fall between the upper and lower threshold, the size of the outer border 216 may be again adjusted and the search executed for a third time. In various embodiments, however, the number of times that the size of the outer border 216 of the search region is adjusted is limited. In one embodiment, the outer border 216 may only be adjusted a single time.

In various embodiments where the system is implemented within a vehicle, the outer border 216 of a particular search region may be adjusted depending on the vehicle's status and user's profile. For example, if the vehicle is driving at a high speed, the system can adjust the outer border 216 (e.g., by increasing the size of outer border 216) because the car is moving quickly past candidate POIs. Conversely, as the vehicle slows down, the size of the outer border 216 may be reduced.

In one specific embodiment, the outer border 216 may be defined as an ellipsis. In that case, when the system is utilized within a vehicle, the elliptical outer border 216 of the search area could be configured so that the major axis of outer border 216 is oriented in the vehicle's direction of travel and has a length that is based at least somewhat upon the vehicle's speed. In that case, the minor axis of the elliptical outer border 216 of the search region could be sized proportionally to the POI density in the vehicle's current location. The vehicle may be placed at a focus of the ellipse. This would result in a search area that is skewed toward the vehicle's direction of travel, which would beneficially return more POIs that are ahead of the vehicle. In some embodiments, the elliptical outer border 216 of the search region may be weighted a distance ahead of the vehicle in the vehicle's direction of travel or along the road the vehicle is currently traveling upon so as to encompass approaching POIs. In that case, the distance that the elliptical outer border 216 is placed ahead of the vehicle may be at least partially determined by the vehicle velocity of travel.

Accordingly, by utilizing a modified outer border 216 for a particular search region, the present system can control the search radius to ensure that the user is presented with a reasonable number of results in response to a search. In an example, a car and driver are travelling from one major city to another, e.g., going from Los Angeles, Calif. to Las Vegas, Nev. In such an example, there may be regions of the journey where there are no major POIs for miles ahead of the vehicle followed by regions (e.g., within one of the cities) with a very large number of POIs in one relatively confined area. The present system, therefore, when miles away from the densely populated POIs, can increase the search radius to collect information about those POIs and generate search results that incorporate those POIs. Conversely, the system may also decrease the search radius to avoid overwhelming the driver by presenting too large a number of POIs when the vehicle is located within a region having densely populated POIs.

So configured, a user indication recognition system is provided that can allow for narrowing of selections of POIs by a user and/or on the fly by the system. As such, a preoccupied user (such as a driver of a vehicle) may be able to quickly and precisely determine a POI with less cognitive distractions. Also, the user indication recognition system can simultaneously accommodate multiple distinct environments (for example, an inner 204 and outer environment 206). This can be particularly beneficial when one environment (for example, an outer environment) is evolving or evolvable such that information may be sought or commands given by a user with respect to new or evolving POIs. By utilizing the disclosed system according the various approaches, a user can easily, quickly, and safely access information about or provide commands relating to POIs, possibly within the multiple environments. For example, this helps prevent illegal or unsafe use of a vehicle's devices or systems (e.g., the radio or navigation) or mobile devices by an operator while operating the vehicle. Further, various approaches described herein can be provided with respect to multiple environments while still maintaining usage of the user indication recognition system 100 with respect to more commonly used systems and elements within an inner environment.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus, comprising:

at least one sensor device configured to sense a first user indication and a second user indication, wherein both of the user indications include an indication gesture or an audible indication and are user actions, wherein neither of the first user indication and the second user indication are associated with operation of a map;

a processing device communicatively coupled to the at least one sensor device, the processing device configured to:

determine an occurrence of the first user indication;

in response to the first user indication, determine a plurality of Points of Interest (POIs) corresponding to the first user indication;

determine an occurrence of the second user indication;

determine whether the second user indication is associated with a POI determined in response to the first user indication and whether the second user indication is associated with a POI outside of the plurality of POIs determined in response to the first user indication;

when it is determined that the second user indication is associated with the POIs determined in response to the first user indication, determining a narrowed POI from the plurality of POIs;

turning off one or more potential POI targets associated with the second user indication based on the second, non-map-related operation user indication being associated with, the POI outside of the plurality of POIs determined in response to the first user indication;

after determining the occurrence of both the first user indication and the second indication, determine an action corresponding to the narrowed POI based on the first user indication and the second user indication; and effect performance of the action based on the first user indication and the second user indication.

2. The apparatus of claim 1, wherein the first user indication is a coarse user indication including an indication gesture associated with a direction.

3. The apparatus of claim 1, wherein the second user indication is a fine user indication associated with the audible indication.

4. The apparatus of claim 1, wherein the processing device is further configured to effect presentation of the plurality of POIs to a user in response to determining the occurrence of both the first user indication and the second indication.

5. The apparatus of claim 1, wherein the processing device is further configured to determine the plurality of POIs using environmental data, a time of day, a present location, a known location, information associated with a present user, a user setting, or an historical record of POIs.

6. The apparatus of claim 1, wherein the first user indication is a coarse user indication associated with the audible indication.

7. The apparatus of claim 1, wherein the second user indication is a fine user indication including the indication gesture.

8. The apparatus of claim 1, wherein the processing device is configured to effect performance of the action comprises the processing device being configured to:

enable saving a location of the narrowed POI;

enable provision of information pertaining to the narrowed POI;

enable provision of information pertaining to a present location of a contact in relation to the narrowed POI;

identify the narrowed POI as a hazard;

enable a modification or an initiation of a navigation route; or enable operation of a barrier operator.

9. The apparatus of claim 1, wherein the processing device is configured to determine the plurality of POIs by using location data, compass data, steering wheel angle data, speed data, or controller area network (CAN) bus data.

10. A method, comprising:

sensing an occurrence of a first user indication, wherein the first user indication is a coarse user indication;

determining a plurality of Points of Interest (POIs) corresponding to the first user indication;

sensing an occurrence of a second user indication, wherein the second user indication is a fine user indication, wherein both of the user indications are user actions, wherein neither of the first user indication and the second user indication are associated with operation of a map;

determining whether the second user indication is associated with a POI determined in response to the first user indication and whether the second user indication is associated with a POI outside of the plurality of POIs determined in response to the first user indication;

when it is determined that the second user indication is associated with the POIs determined in response to the first user indication, determining a narrowed POI from the plurality of POIs;

turning off one or more potential POI targets associated with the second user indication based on the second, non-map-related operation user indication being associated with the POI outside of the plurality of POIs determined in response to the first user indication;

determining an action corresponding to the narrowed POI based on the first user indication and the second user indication; and performing the action based on the first user indication and the second user indication.

11. The method of claim 10, comprising presenting the plurality of POIs to a user in response to determining the plurality of POIs using a visual representation of the plurality of POIs on a display device or an audible representation of the plurality of POIs.

12. The method of claim 11, comprising enabling the user to interact with the presentation of the plurality of POIs based on the second user indication.

13. The method of claim 10, comprising determining a default outer border based on a user profile, a current location, a type of search, a threshold value, a border shape, a user preference for a type of road, or a time of day.

14. The method of claim 10, wherein the first user indication includes an indication gesture associated with a direction.

15. The method of claim 10, wherein the second user indication includes an audible indication.

16. A method, comprising:

sensing an occurrence of a first user indication, wherein the first user indication is a coarse user indication including a gesture indication;

determining a plurality of Points of Interest (POIs) corresponding to the first user indication;

sensing an occurrence of a second user indication, wherein the second user indication is a fine user indication including an audible indication, wherein both of the user indications are user actions, wherein neither of the first user indication and the second user indication are associated with operation of a map;

determining whether the second user indication is associated with a POI determined in response to the first user indication and whether the second user indication is associated with a POI outside of the plurality of POIs determined in response to the first user indication;

when it is determined that the second user indication is associated with the POIs determined in response to the first user indication, determining a narrowed POI from the plurality of POIs;

turning off one or more potential POI targets associated with the second user indication such that selection is disabled based on the second, non-map-related operation user indication being associated with the POI outside of the plurality of POIs determined in response to the first user indication;

determining an action corresponding to the narrowed POI based on the first user indication and the second user indication; and performing the action based on the first user indication and the second user indication.

* * * * *